United States Patent
Nakamura et al.

(10) Patent No.: US 12,358,570 B2
(45) Date of Patent: Jul. 15, 2025

(54) MOVABLE SPOILER DEVICE

(71) Applicant: Honda Motor Co., Ltd., Tokyo (JP)

(72) Inventors: Yuki Nakamura, Tokyo (JP); Kei Ambo, Tokyo (JP); Kenichi Ando, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 416 days.

(21) Appl. No.: 18/165,338

(22) Filed: Feb. 7, 2023

(65) Prior Publication Data

US 2023/0264761 A1 Aug. 24, 2023

(30) Foreign Application Priority Data

Feb. 24, 2022 (CN) .......................... 202210173446.9

(51) Int. Cl.
*B62D 35/00* (2006.01)
*B60R 16/03* (2006.01)

(52) U.S. Cl.
CPC ............ *B62D 35/007* (2013.01); *B60R 16/03* (2013.01)

(58) Field of Classification Search
CPC ...... B60R 16/03; B62D 35/007; B62D 37/02; Y02T 10/82
See application file for complete search history.

(56) References Cited

U.S. PATENT DOCUMENTS

| | | | | |
|---|---|---|---|---|
| 2007/0200389 A1* | 8/2007 | Ina | ....................... | B62D 35/007 |
| | | | | 296/180.1 |
| 2019/0118704 A1* | 4/2019 | Stein | .................... | H01B 7/0045 |
| 2020/0108877 A1* | 4/2020 | Prabhakar | ............ | B60Q 1/0035 |
| 2021/0269102 A1* | 9/2021 | Lindberg | ............... | B62D 37/02 |

FOREIGN PATENT DOCUMENTS

JP          H02100883          8/1990

OTHER PUBLICATIONS

JP 01145247 A (Year: 1989).*
CN 112172938 A (Year: 2021).*

* cited by examiner

*Primary Examiner* — Lori Lyjak
(74) *Attorney, Agent, or Firm* — JCIPRNET

(57) ABSTRACT

A movable spoiler device includes a fixed plate fixed on a vehicle body of a vehicle; a movable plate arranged to be movable between a storing position and an unfolding position closer to the rear than the storing position; a link mechanism provided with one end pivotally supported on the fixed plate and the other end pivotally supported on the movable plate; an electrical component arranged in the vicinity of the movable plate; and a wire harness configured for connecting the electrical component to a battery arranged on the vehicle body. A first portion of the wire harness is fixed at the other end of the link mechanism corresponding to the movable plate, and a second portion of the wire harness is bent on the one end of the link mechanism corresponding to the fixed plate.

6 Claims, 7 Drawing Sheets

MOVABLE SPOILER DEVICE

CROSS-REFERENCE TO RELATED APPLICATION

This application claims the priority benefit of China application no. CN,202210173446.9, filed on Feb. 24, 2022. The entirety of the above-mentioned patent application is hereby incorporated by reference herein and made a part of this specification.

BACKGROUND

Technical Field

The disclosure relates to a movable spoiler device.

DESCRIPTION OF RELATED ART

In the related art (Japanese Utility Model Publication No. JPH02100883U), a spoiler device is generally arranged at the rear end of the vehicle to improve the aerodynamic performance of the vehicle. A common movable spoiler device can be a fixed spoiler with a specific shape, and at present, there are also spoiler devices that are provided as a combination of a fixed plate and a movable plate. Therefore, the movable plate can be moved relative to the fixed plate in the vehicle front-rear direction via the link mechanism to change the position, and the aerodynamic performance may thus be adjusted. However, if electrical components such as stop lamps are installed near the movable spoiler device, further consideration must be given to whether the electrical components and the wiring harness used will interfere with the movement of the movable spoiler device. That is, it is necessary to improve the installation layout of the electrical components and the wire harness used therefor.

SUMMARY

The disclosure provides a movable spoiler device including a fixed plate, a movable plate, a link mechanism, an electrical component, and a wire harness. The fixed plate is fixed on a vehicle body of a vehicle. The movable plate is arranged to be movable between a storing position and an unfolding position closer to the rear than the storing position. The link mechanism is provided with one end pivotally supported on the fixed plate and the other end pivotally supported on the movable plate. The electrical component is arranged in the vicinity of the movable plate. The wire harness is configured for connecting the electrical component to a battery arranged on the vehicle body. A first portion of the wire harness is fixed at the other end of the link mechanism corresponding to the movable plate, and a second portion of the wire harness is bent on the one end of the link mechanism corresponding to the fixed plate.

In order to make the aforementioned and other features and advantages of the invention more comprehensible, several embodiments accompanied with figures are described in detail below.

DESCRIPTION OF THE EMBODIMENTS

The disclosure provides a movable spoiler device in which arrangement of an electrical component and a wiring harness used therefor is prevented from interfering with the movement of the movable spoiler device.

The disclosure provides a movable spoiler device including a fixed plate, a movable plate, a link mechanism, an electrical component, and a wire harness. The fixed plate is fixed on a vehicle body of a vehicle. The movable plate is arranged to be movable between a storing position and an unfolding position closer to the rear than the storing position. The link mechanism is provided with one end pivotally supported on the fixed plate and the other end pivotally supported on the movable plate. The electrical component is arranged in the vicinity of the movable plate. The wire harness is configured for connecting the electrical component to a battery arranged on the vehicle body. A first portion of the wire harness is fixed at the other end of the link mechanism corresponding to the movable plate, and a second portion of the wire harness is bent on the one end of the link mechanism corresponding to the fixed plate.

In an embodiment of the disclosure, a third portion of the wire harness is fixed onto the fixed plate closer to the vehicle body than the link mechanism.

In an embodiment of the disclosure, a remaining bent portion is provided between the first portion and the third portion of the wire harness, and a fixing point of the wire harness is provided at a position other than the remaining bent portion.

In an embodiment of the disclosure, the second portion of the wire harness is fixed to the one end of the link mechanism.

To sum up, in the movable spoiler device provided by the disclosure, the electrical component is provided in the vicinity of the movable plate, and the wire harness connects the electrical component to the battery provided on the vehicle body. The first portion of the wire harness is fixed at the other end of the link mechanism corresponding to the movable plate, and the second portion of the wire harness is bent on the one end of the link mechanism corresponding to the fixed plate. In this way, when the electrical component is provided in the vicinity of the movable plate, the wire harness bent along the link mechanism may be unfolded along the link mechanism along with the movement of the movable plate without affecting the movement of the link mechanism. Accordingly, the arrangement of the electrical component and the wiring harness used in the movable spoiler device provided by the disclosure may be prevented from interfering with the movement of the movable spoiler device.

Figure 1:
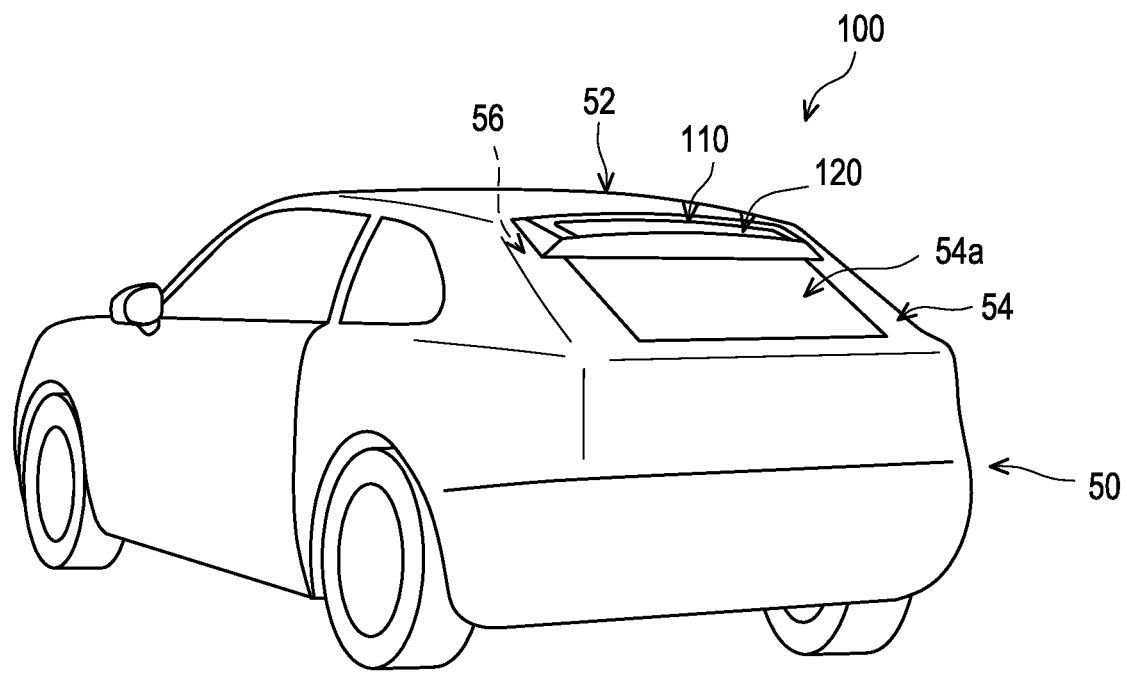
FIG. 1 is a schematic view of a movable spoiler device applied on a vehicle according to an embodiment of the disclosure.
Figure 1:
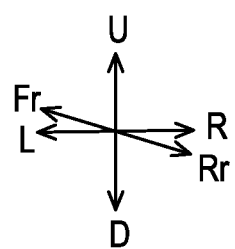
Figure 2A:
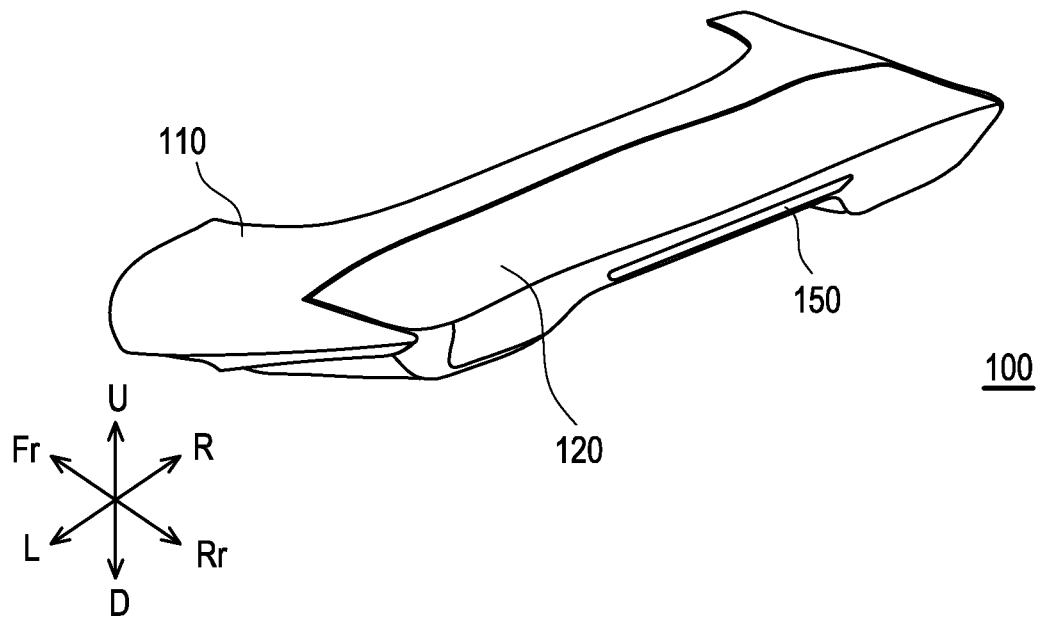
FIG. 2A and FIG. 2B are schematic views of the appearance of the movable spoiler device shown in FIG. 1 in a storing position and an unfolding position.
Figure 2B:
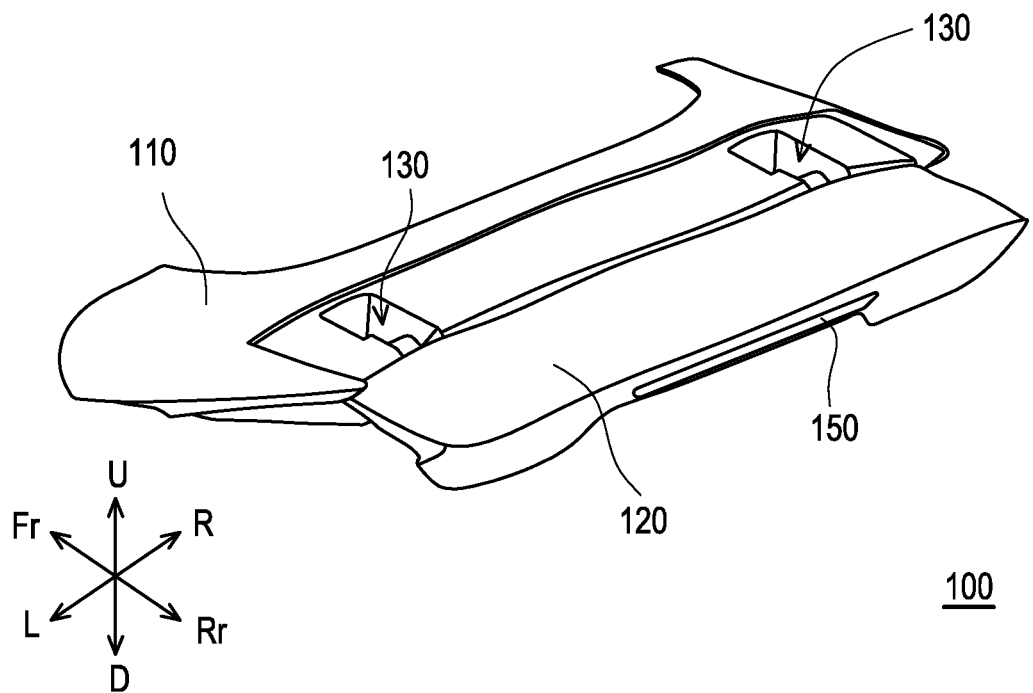
Figure 3A:
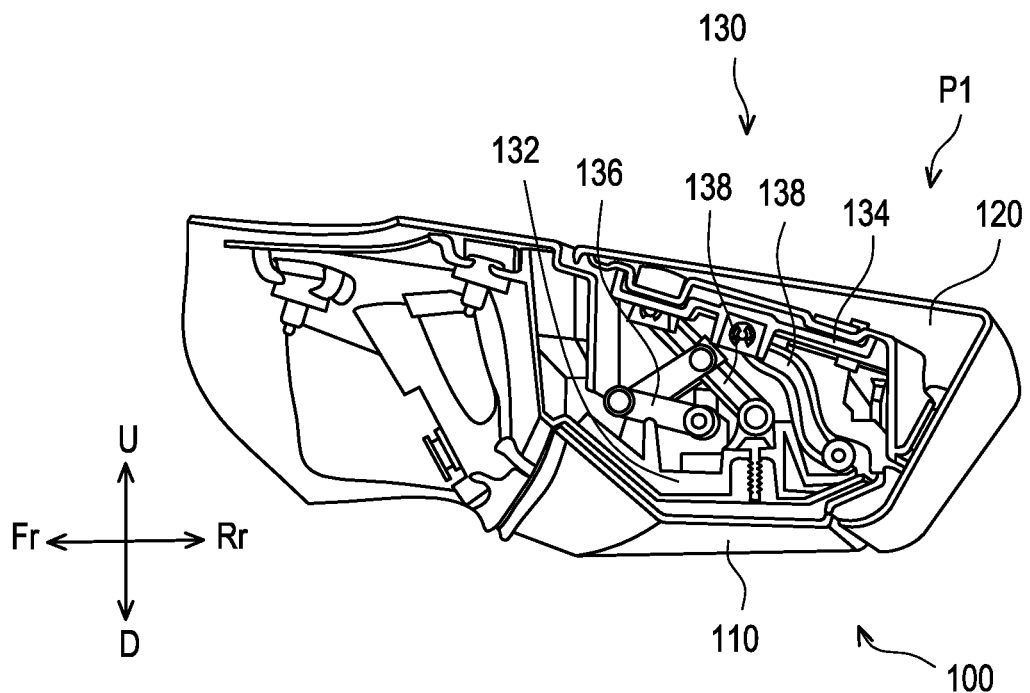
FIG. 3A and FIG. 3B are schematic cross-sectional views of the movable spoiler device shown in FIG. 2A and FIG. 2B in a vehicle width direction.
Figure 3B:
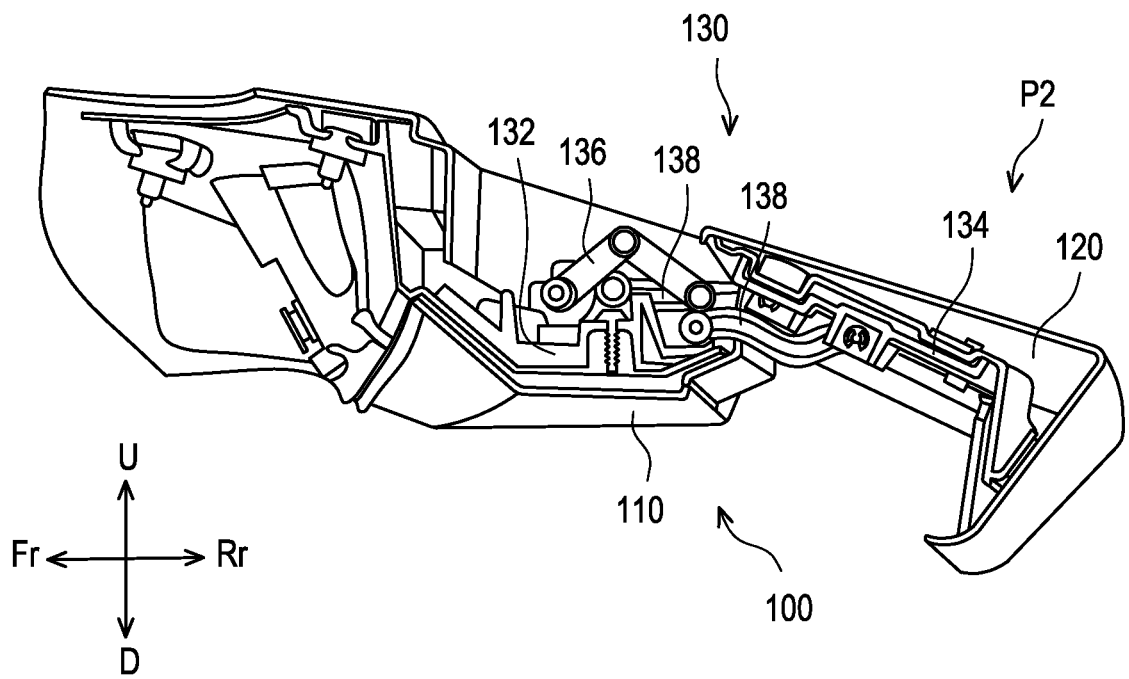
Figure 4A:
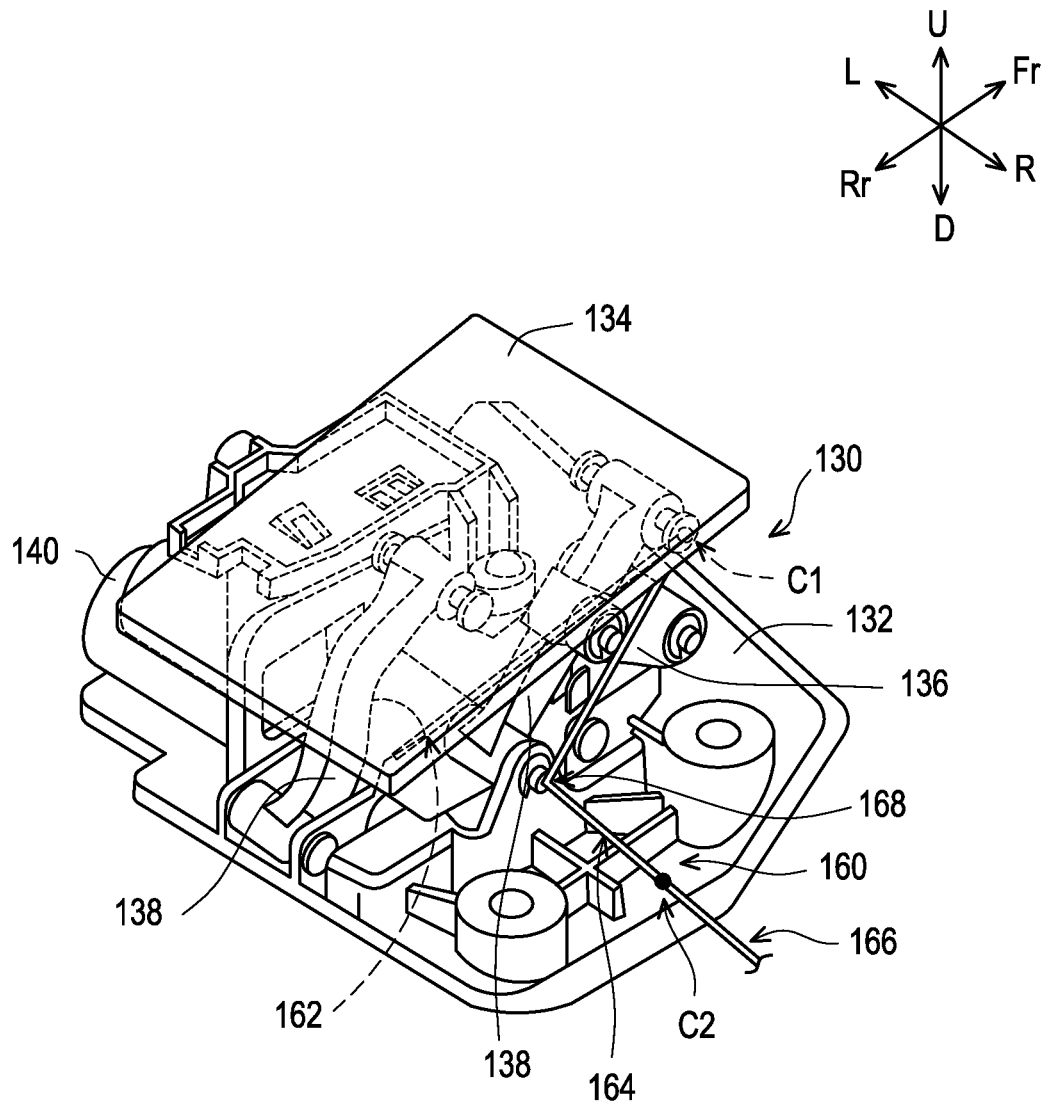
FIG. 4A and FIG. 4B are schematic views of the appearance of a link mechanism used in the movable spoiler device shown in FIG. 3A and FIG. 3B.
Figure 4B:
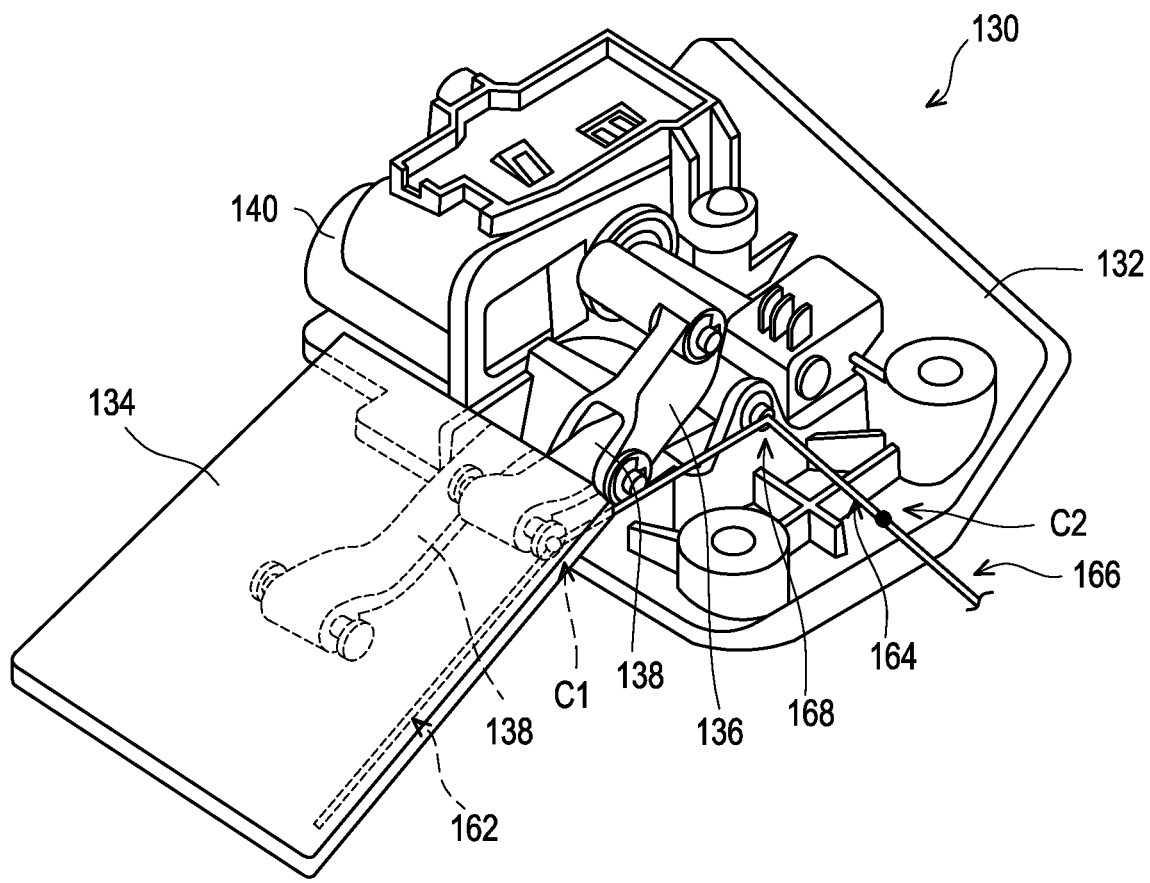
Figure 5A:
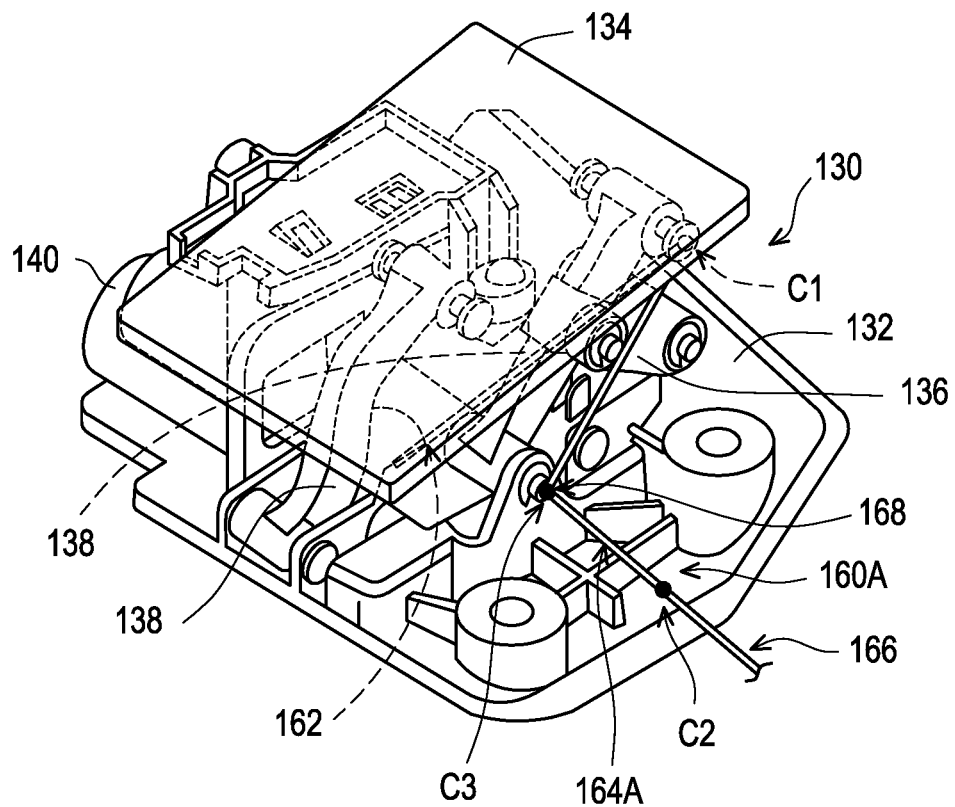
FIG. 5A and FIG. 5B are schematic views of the appearance of variation examples of the link mechanism shown in FIG. 4A and FIG. 4B.
Figure 5B:
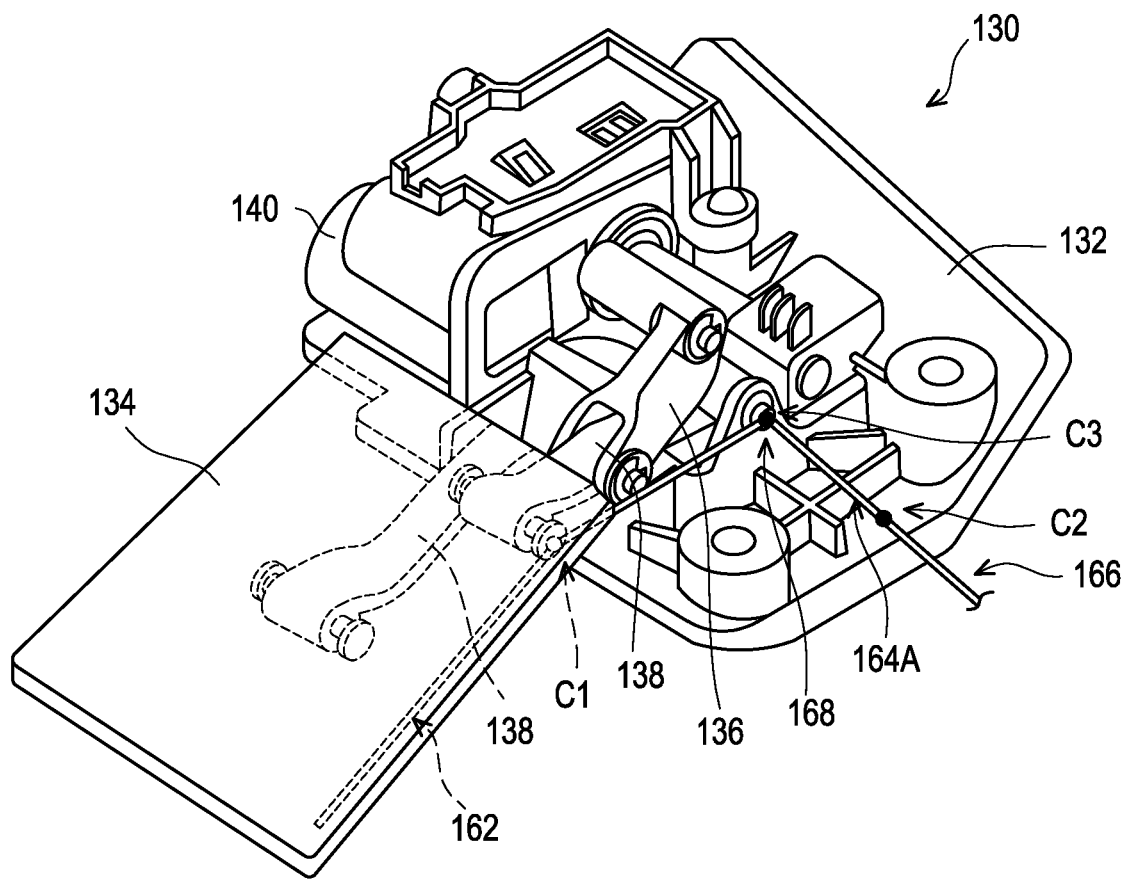

Descriptions of the disclosure are given with reference to the exemplary embodiments illustrated by the accompanying drawings. Herein, FIG. 1 is a schematic view of a movable spoiler device applied on a vehicle according to an embodiment of the disclosure. FIG. 2A and FIG. 2B are schematic views of the appearance of the movable spoiler device shown in FIG. 1 in a storing position and an unfolding position. FIG. 3A and FIG. 3B are schematic cross-sectional views of the movable spoiler device shown in FIG. 2A and FIG. 2B in a vehicle width direction. FIG. 4A and FIG. 4B are schematic views of the appearance of a link mechanism used in the movable spoiler device shown in FIG. 3A and FIG. 3B. FIG. 5A and FIG. 5B are schematic views of the appearance of variation examples of the link mechanism shown in FIG. 4A and FIG. 4B. The applications and the specific structure of a movable spoiler device 100 provided by the present embodiment will be described below together with FIG. 1 to FIG. 5B. Herein, in the following paragraphs, a vehicle front-rear direction, for example, refers to a vehicle front direction Fr and a vehicle rear direction Rr in the drawings. A vehicle width direction refers to, for example, a vehicle left direction L and a vehicle right direction R in the drawing. Further, a vehicle up-down direction, for example, refers to a vehicle up direction U and a vehicle down direction D in the drawings. However, this is only one example of the disclosure, and the disclosure is not limited thereto.

With reference to FIG. 1, in this embodiment, the movable spoiler device 100 is adapted to be provided at the rear end of a vehicle 50 (shown in FIG. 1) as an exterior component to stabilize airflow passing through the vehicle 50, thereby improving aerodynamic performance. Herein, the movable spoiler device 100 is, for example, an elongated structure that spans the left and right sides (e.g., the vehicle left direction L and the vehicle right direction R in FIG. 1) of the vehicle 50 in the vehicle width direction and is provided behind a roof 52 of the vehicle 50 and above a tailgate 54 of the vehicle 50, that is, at the interface between the roof 52 and the tailgate 54. However, in other embodiments that are not shown, the movable spoiler device 100 may be arranged below rear end glass 54a used by the tailgate 54 of the vehicle 50 and may also be arranged at other parts of the vehicle 50 according to needs. The application of the movable spoiler device 100 on the vehicle 50 is not limited in the disclosure, and it can be adjusted according to needs.

To be specific, in this embodiment, as shown in FIG. 1 to FIG. 3, the movable spoiler device 100 includes a fixed plate 110, a movable plate 120, and a link mechanism 130 (shown in FIG. 3A and FIG. 3B). The fixed plate 110 fixed on a vehicle body 56 of the vehicle 50. The movable plate 120 is arranged to be movable between a storing position P1 (as shown in FIG. 2A and FIG. 3A) and an unfolding position P2 (as shown in FIG. 2B and FIG. 3B) closer to the rear (i.e., one side corresponding to the vehicle rear direction Rr) than the storing position P1. The link mechanism 130 is arranged between the fixed plate 110 and the movable plate 120 (as shown in FIG. 3A and FIG. 3B). Further, one end (e.g., one end corresponding to the vehicle down direction D) of the link mechanism 130 is pivotally supported on the fixed plate 110, and the other end (e.g., one end corresponding to the vehicle up direction U) is pivotally supported on the movable plate 120. As such, the movable plate 120 may move between the storing position P1 and the unfolding position P2 with respect to the fixed plate 110 via the link mechanism 130 (as shown in FIG. 3A and FIG. 3B).

Further, in this embodiment, each of the fixed plate 110 and the movable plate 120 refers to an elongated plate structure and is not limited to a single plate, but may also be a composite plate formed by combining a plurality of plates (as shown in FIG. 3A and FIG. 3B). Further, the storing position P1 refers to, for example, a position where the movable plate 120 is located above the fixed plate 110 (i.e., one side corresponding to the vehicle up direction U). Therefore, the movable plate 120 and the fixed plate 110 at least partially overlap to form a storing state (as shown in FIG. 2A and FIG. 3A). Accordingly, the unfolding position P2 refers to, for example, a position where the movable panel 120 is located behind the fixed panel 110 (i.e., one side corresponding to the vehicle rear direction Rr). Therefore, the movable plate 120 moves to the rear of the fixed plate 110 to form an unfolding state (as shown in FIG. 2B and FIG. 3B).

Further, in this embodiment, as shown in FIG. 3A to FIG. 4B, the link mechanism 130 is, for example, a multi-link. For instance, a lower plate 132, an upper plate 134, a driving rod 136, and a pair of driven rods 138 are provided as the link mechanism 130 between the fixed plate 110 and the movable plate 120. Herein, the lower plate 132 is connected to the fixed plate 110, and the upper plate 134 is connected to the movable plate 120. The pair of driven rods 138 are arranged side by side in the vehicle front-rear direction and are pivotally connected to the lower plate 132 and the upper plate 134. The driving rod 136 is provided on the lower plate 132 and is pivotally connected to one of the pair of driven rods 138 (e.g., connected to the driven rod 138 among the pair of driven rods 138 corresponding to the vehicle front direction Fr), but the disclosure is not limited thereto.

Therefore, in this embodiment, the lower plate 132 and the upper plate 134 modularize the driving rod 136 and the pair of driven rods 138 forming the multi-link, so that the link mechanism 130 may be easily installed between the fixed plate 110 and the movable plate 120. A pair of the modularized link mechanisms 130 may be provided on opposite sides of the fixed plate 110 and the movable plate 120 in the vehicle width direction or one may be provided at a substantially middle position in the width direction. However, in other embodiments that are not shown, the lower plate 132 and the upper plate 134 may be omitted, and the combination of the driving rod 136 and the pair of driven rods 138 may be directly provided at the corresponding positions of the fixed plate 110 and the movable plate 120 as the link mechanism. The disclosure is not limited thereto.

Therefore, in this embodiment, the driving rod 136 moves from the front (i.e., one side corresponding to the vehicle front direction Fr) to the rear (i.e., one side corresponding to the vehicle rear direction Rr), and the driving rod 136 drives one (e.g., the driven rod 138 corresponding to the vehicle front direction Fr) of the pair of driven rods 138 to move backwards and pushes the upper plate 134 backwards relative to the lower plate 132. At the same time, the other one of the pair of driven rods 138 (e.g., the driven rod 138 corresponding to the vehicle rear direction Rr) also moves backwards along with the movement of the upper plate 134. Therefore, the movable plate 120 is driven by the link mechanism 130 to move backwards relative to the fixed plate 110, for example, from the storing position P1 (as shown in FIG. 3A and FIG. 4A) to the unfolding position P2 (as shown in FIG. 3B and FIG. 4B).

In contrast, in this embodiment, the driving rod 136 moves from the rear to the front, and the driving rod 136 drives one of the pair of driven rods 138 to move forwards and pulls the upper plate 134 forwards relative to the lower plate 132. At the same time, the other one of the pair of driven rods 138 also moves forwards along with the movement of the upper plate 134. Therefore, the movable plate 120 is driven by the link mechanism 130 to move forwards relative to the fixed plate 110, for example, from the unfolding position P2 (as shown in FIG. 3B and FIG. 4B) to the storing position P1 (as shown in FIG. 3A and FIG. 4A).

Further, in this embodiment, as shown in FIG. 4A and FIG. 4B, the link mechanism 130 is driven by an actuator 140. The actuator 140 is, for example, disposed on the lower plate 132 and is located on the sides of the driving rod 136 and the pair of driven rods 138. Moreover, the actuator 140 is connected to the driving rod 136 of the link mechanism 130. As such, the link mechanism 130 may perform the abovementioned moving operation via the driving rod 136 under the driving of the actuator 140. However, the abovementioned structure, movement, and arrangement of the actuator 140 of the link mechanism 130 are only one example and may be adjusted according to needs, and the disclosure is not limited thereto.

In addition, in this embodiment, the movable spoiler device 100 includes an electrical component 150 (shown in FIG. 2A and FIG. 2B) and a wire harness 160 (shown in FIG. 4A and FIG. 4B). The electrical component 150 is arranged in the vicinity of the movable plate 120. The wire harness 160 connects the electrical component 150 to the battery (not shown) provided on the vehicle body 56. The electrical component 150 is, for example, a stop lamp, but not limited thereto. The position of the electrical component 150 is, for example, provided at the rear end (i.e., one end corresponding to the vehicle rear direction Rr) of the movable plate 120, so that the arrangement of the electrical component 150 does not affect the movement of the movable plate 120. Accordingly, since the wire harness 160 is connected between the electrical component 150 and the battery (not shown) provided on the vehicle body 56, the position of the wire harness 160 is required to be planned.

To be specific, in this embodiment, as shown in FIG. 4A and FIG. 4B, a first portion 162 of the wire harness 160 is fixed to the other end of the link mechanism 130 corresponding to the movable plate 120. For instance, the first portion 162 of the wire harness 160 is fixed onto the upper plate 134 connected to the movable plate 120 and extends substantially along the driven rod 138 of the pair of driven rods 138 corresponding to the vehicle rear direction Rr. Accordingly, a second portion 164 of the wire harness 160 is bent on the one end of the link mechanism 130 corresponding to the fixed plate 110. For instance, the second portion 164 of the wire harness 160 is disposed on the lower plate 132 connected to the fixed plate 110, extends substantially along the driven rod 138 of the pair of driven rods 138 corresponding to the vehicle front direction Fr, and is further bent and disposed on the lower plate 132. It thus can be seen that when the movable plate 120 is driven by the link mechanism 130 and moves from the storing position P1 to the unfolding position P2 (e.g., moving from FIG. 4A to FIG. 4B), the first portion 162 of the wire harness 160 moves backwards along with the movable plate 120 and the upper plate 134. Therefore, the second portion 164 of the wire harness 160 is stretched backwards from the bent state with the driving of the first portion 162.

Further, in this embodiment, after the movable plate 120 and the upper plate 134 move backwards to the unfolding position P2, the second portion 164 of the wire harness 160 is preferably maintained in the bent state after being stretched backwards from the bent state (as shown in FIG. 4B). That is, the length of the second portion 164 of the wire harness 160 arranged in a curved manner is arranged to be longer. However, in other embodiments that are not shown, the second portion 164 of the wire harness 160 may also be just straightened when the movable plate 120 and the upper plate 134 move backwards to the unfolding position P2, as long as the length of the second portion 164 of wire harness 160 does not affect the movement of the link mechanism 130, and the disclosure is not limited thereto. In this way, when the electrical component 150 is provided in the vicinity of the movable plate 120, the wire harness 160 bent along the link mechanism 130 may be unfolded along the link mechanism 130 along with the movement of the movable plate 120 without affecting the movement of the link mechanism 130. Accordingly, the arrangement of the electrical component 150 and the wiring harness 160 used in the movable spoiler device may be prevented from interfering with the movement of the movable spoiler device 100.

Further, in this embodiment, a third portion 166 of the wire harness 160 is fixed onto the fixed plate 110 closer to the vehicle body 56 than the link mechanism 130. That is, the wire harness 160 includes the first portion 162 fixed to the link mechanism 130 corresponding to the other end (e.g., the upper plate 134) of the movable plate 120, the second portion 164 bent at one end (e.g., the lower plate 132) of the link mechanism 130 corresponding to the fixed plate 110, and the third portion 166 fixed to the fixed plate 110 closer to the vehicle body 56 than the link mechanism 130. In this way, at least the first portion 162 and the third portion 166 of the wire harness 160 are fixed, so that the wire harness 160 is not easily displaced due to the movement of the movable plate 120 and the upper plate 134.

Preferably, in this embodiment, a remaining bent portion 168 is provided between the first portion 162 and the third portion 166 of the wire harness 160, and a fixing point of the wire harness 160 is provided at a position other than the remaining bent portion 168. That is, the second portion 164 of the wire harness 160 is bent and at least a portion of the wire harness 160 (i.e., the remaining bent portion 168) is not fixed, so that there is no fixing point for the wire harness 160 on the remaining bent portion 168. The fixing point of the wire harness 160 is preferably fixing points C1 and C2 as shown in FIG. 4A and FIG. 4B, which correspond to the upper plate 134 (connected to the movable plate 120) and the lower plate 132 (connected to the fixed plate 110) and the first portion 162 and the third portion 166 respectively. In this way, it can be ensured that the second portion 164 of the wire harness 160 is bent, is not restricted by the fixing point, and can be unfolded along with the rearward movement of the movable plate 120 and the upper plate 134.

Accordingly, in the variation examples shown in FIG. 5A and FIG. 5B, a second portion 164A of a wire harness 160A used in the movable spoiler device 100 is fixed to one end (e.g., the lower plate 132 of the fixed plate 110) of the link mechanism 130. That is, in addition to the fixing points C1 and C2 corresponding to the upper plate 134 (connected to the movable plate 120) and the lower plate 132 (connected to the fixed plate 110) and corresponding to the first portion 162 and the third portion 166 respectively, the wire harness 166 also has the fixing point C3 corresponding to the second portion 164A. The second portion 164 is bent and is further fixed onto the lower plate 132 (connected to the fixed plate 110). Moreover, the wire harness 160A may not be provided with the remaining bent portion 168, but it is not limited thereto. In this way, the second portion 160A of the wire harness 164 is ensured to be unfolded within the predetermined range and does not become entangled in the vicinity of the link mechanism 130. It thus can be seen that the numbers and positions of the fixing points of the wire harnesses 160 and 160A are not limited, and the fixing methods of the wire harnesses 160 and 160A are not limited in the disclosure, which may be adjusted according to needs.

In view of the foregoing, in the movable spoiler device provided by the disclosure, the electrical component is provided in the vicinity of the movable plate, and the wire harness connects the electrical component to the battery provided on the vehicle body. The first portion of the wire harness is fixed at the other end of the link mechanism corresponding to the movable plate, and the second portion of the wire harness is bent on the one end of the link mechanism corresponding to the fixed plate. Preferably, the third portion of the wire harness is fixed onto the fixed plate closer to the vehicle body than the link mechanism. Further, the remaining bent portion is provided between the first portion and the third portion of the wire harness, and the fixing point of the wire harness is provided at a position other than the remaining bent portion. In this way, when the electrical component is provided in the vicinity of the movable plate, the wire harness bent along the link mechanism may be unfolded along the link mechanism along with the movement of the movable plate without affecting the movement of the link mechanism. Accordingly, the arrangement of the electrical component and the wiring harness used in the movable spoiler device provided by the disclosure may be prevented from interfering with the movement of the movable spoiler device.

Finally, it is worth noting that the foregoing embodiments are merely described to illustrate the technical means of the disclosure and should not be construed as limitations of the disclosure. Even though the foregoing embodiments are referenced to provide detailed description of the disclosure, people having ordinary skill in the art should understand that various modifications and variations can be made to the technical means in the disclosed embodiments, or equivalent replacements may be made for part or all of the technical features; nevertheless, it is intended that the modifications, variations, and replacements shall not make the nature of the technical means to depart from the scope of the technical means of the embodiments of the disclosure.

What is claimed is:

1. A movable spoiler device, comprising:
   a fixed plate fixed on a vehicle body of a vehicle;
   a movable plate arranged to be movable between a storing position and an unfolding position closer to the rear than the storing position;
   a link mechanism, provided with one end pivotally supported on the fixed plate and the other end pivotally supported on the movable plate;
   an electrical component arranged in the vicinity of the movable plate; and
   a wire harness configured for connecting the electrical component to a battery arranged on the vehicle body, wherein
   a first portion of the wire harness is fixed at the other end of the link mechanism corresponding to the movable plate, and a second portion of the wire harness is bent on the one end of the link mechanism corresponding to the fixed plate.

2. The movable spoiler device according to claim 1, wherein
   a third portion of the wire harness is fixed onto the fixed plate closer to the vehicle body than the link mechanism.

3. The movable spoiler device according to claim 1, wherein
   a remaining bent portion is provided between the first portion and the third portion of the wire harness, and a fixing point of the wire harness is provided at a position other than the remaining bent portion.

4. The movable spoiler device according to claim 2, wherein
   a remaining bent portion is provided between the first portion and the third portion of the wire harness, and a fixing point of the wire harness is provided at a position other than the remaining bent portion.

5. The movable spoiler device according to claim 1, wherein
   the second portion of the wire harness is fixed to the one end of the link mechanism.

6. The movable spoiler device according to claim 2, wherein
   the second portion of the wire harness is fixed to the one end of the link mechanism.

* * * * *